Aug. 9, 1927.

C. A. WOOLSEY

CRATE

Original Filed Dec. 7, 1923   2 Sheets-Sheet 1

1,638,229

Inventor
Charles A. Woolsey
By Paul, Paul & Moore
Attorneys

Aug. 9, 1927. 1,638,229
C. A. WOOLSEY
CRATE
Original Filed Dec. 7, 1923 2 Sheets-Sheet 2

Inventor
Charles A. Woolsey
By Paul, Paul & Moore
Attorneys

Patented Aug. 9, 1927.

1,638,229

UNITED STATES PATENT OFFICE.

CHARLES A. WOOLSEY, OF MINNEAPOLIS, MINNESOTA, ASSIGNOR TO NORTHWESTERN COLLAPSIBLE CARRIER CO., OF ST. PAUL, MINNESOTA, A CORPORATION OF MINNESOTA.

CRATE.

Application filed December 7, 1923, Serial No. 679,122. Renewed June 15, 1925.

My invention relates to crates designed particularly for transporting milk bottles from place to place and the object of the invention is to provide a simple inexpensive grid construction in the lower portion of the crate which will be capable of resisting pressure of a truck thereon or the load resulting from piling one crate upon another.

The invention consists generally in various constructions and combinations all as hereinafter described and particularly pointed out in the claims.

In the accompanying drawings forming part of this specification,

Figure 1:
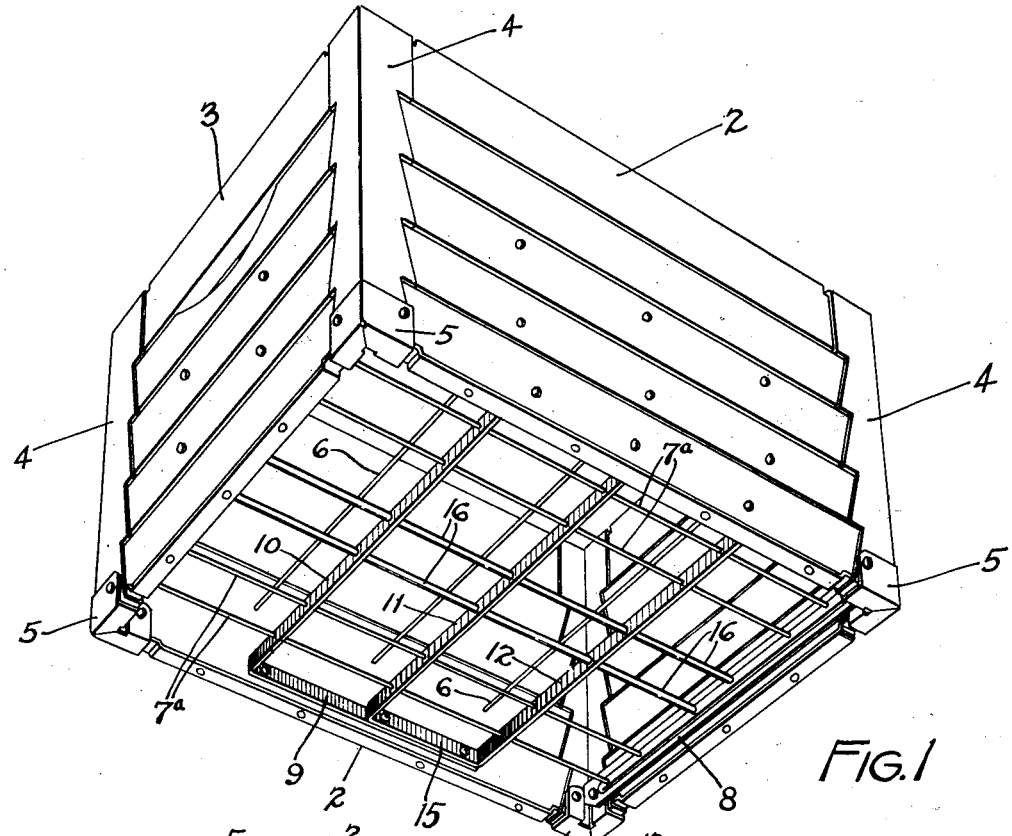
Figure 1 is a perspective view of a crate embodying my invention.
Figure 2:
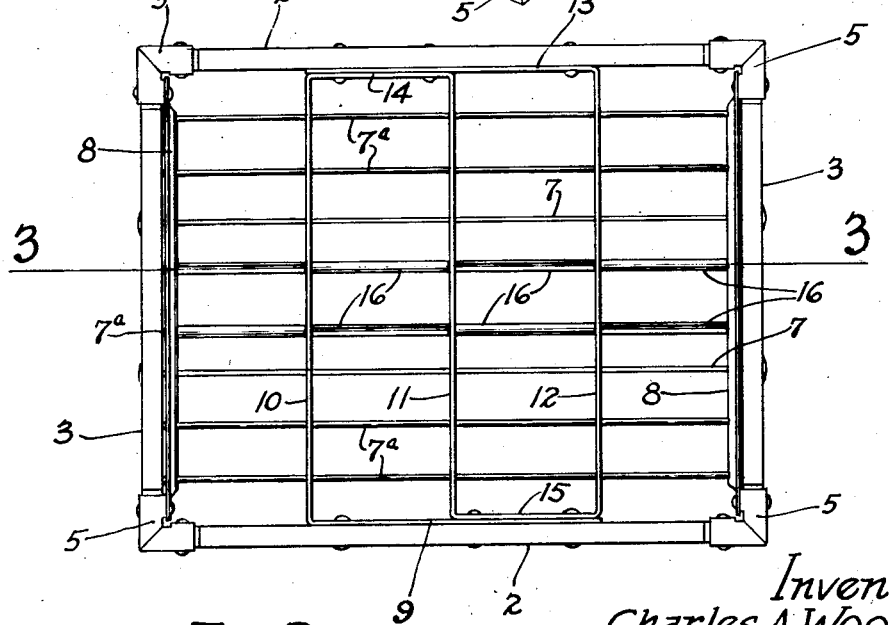
Figure 2 is a bottom view of the same.
Figure 3:
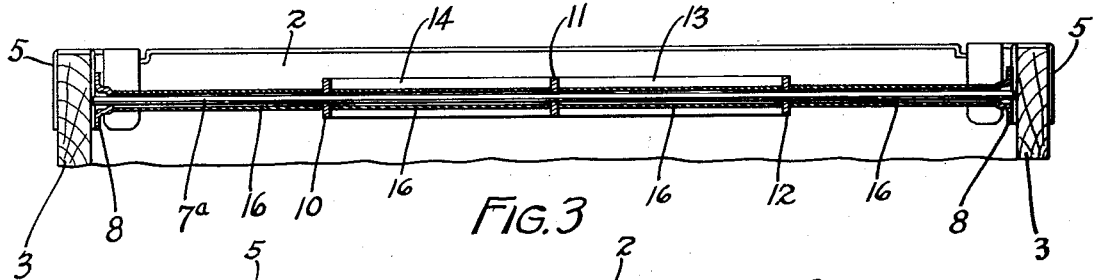
Figure 3 is a sectional view on the line 3—3 of Figure 2.

In the drawing 2 and 3 represent the side and end walls of the crate composed preferably of narrow slats or bars placed edge to edge and reinforced and secured together at the corners by angle plates 4 and bottom corner irons 5. The interior of the crate is divided by longitudinal and transverse rods 6 and 7 into a series of rectangular spaces or compartments adapted to receive bottles in an upright position, this particular crate being designed to contain milk bottles. The lower walls of the crate are provided with longitudinal rods $7^a$ on which the lower ends of the bottles are seated, and secured to the end walls are plates 8 having holes therein to receive the ends of the rods $7^a$. For the purpose of bracing and supporting these rods to prevent them from being twisted out of shape by the weight of the bottles or by a severe blow or by the pressure of some object thereon, I provide a reinforcing strengthening member consisting preferably of a strap of metal having a bent end portion 9 secured to one of the side walls of the crate and cross bar portions 10, 11 and 12 formed by passing the bar back and forth across the grate and finally securing the end 13 thereof to the wall of the crate on the opposite side thereof from the end 9. The bars 14 and 15 connecting the cross members 10, 11 and 12 are secured through the ends 9 and 13 respectively to the side walls of the crate by suitable rivets. Holes are provided in the cross members 10, 11 and 12 through which the rods $7^a$ pass and preferably spacing sleeves 16 are placed on the rods $7^a$ between the cross members for the purpose of holding said members in alignment and preventing their endwise movement on the rods. The ends 9 and 13 and the bars 14 and 15 will brace the end portions of the members 10, 11 and 12 and hold them rigidly in parallel relation with the end walls of the crate. The metal strap as indicated will be edgewise to the pressure of the contents of the crate and to any upward pressure exerted beneath the crate and will resist any sudden or unexpected blow or pressure which with an ordinary construction would distort the rods and damage the contents of the crate. It will be possible with this construction to handle a tier of crates on a two-wheel truck and pile articles of merchandise on the crate without danger of bending the grid or breaking the bottles resting thereon.

Figure 4:
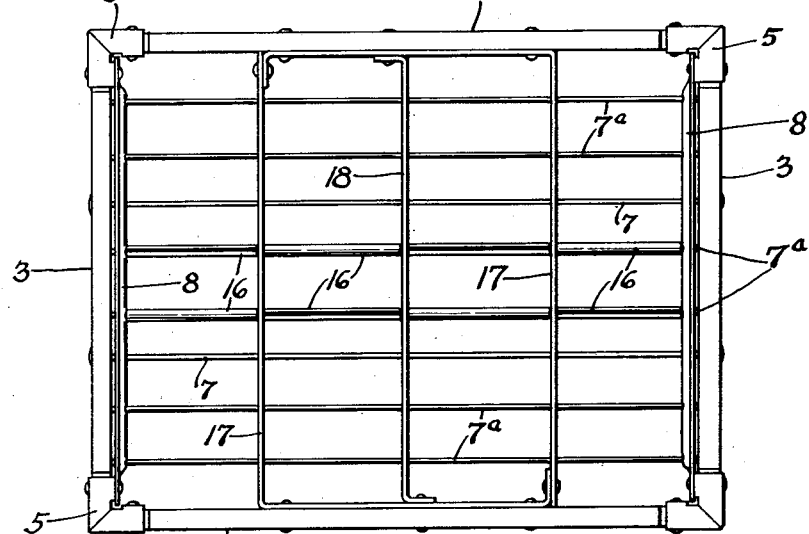
Figure 4 is a bottom view showing a modified form of the grid.

In Figure 4, I have shown a modified construction which consists in providing a rectangular frame 17 consisting of metallic straps bent to fit within the walls of the crate and secured at its ends to the side walls and having a cross bar member 18 intermediate to the side rails of the frame and secured in a similar manner through the end rails of the frame to the walls of the crate.

The rods connecting the end walls of the crate pass through the side rails of the frame and the cross bar 18 in substantially the same manner as described with reference to the previous figures.

Figure 5:
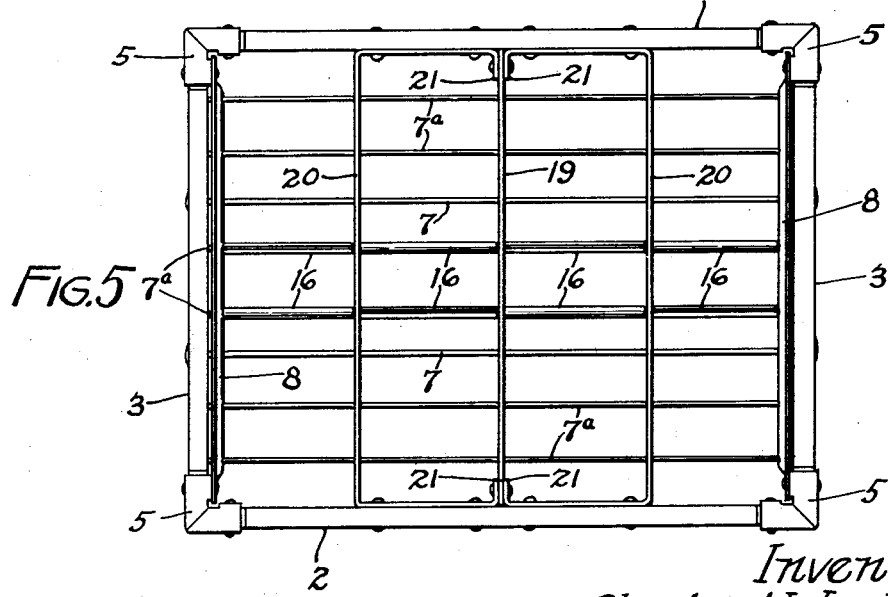
Figure 5 is a similar view showing another modification.

In Figure 5 I have shown a centrally arranged cross bar 19 of strap metal preferably having on opposite sides thereof frame members 20 with their side rails parallel with the bar 19 and spaced therefrom and their end rails seated against the side walls and secured thereto and terminating in inwardly bent ears 21 which are secured together through the bar 19 by rivets or other suitable means. The rods $7^a$ pass through the rails and bars of this figure in the same manner as described and the bracing of the rails and bar at the ends thereof holds them rigidly against longitudinal movement on the rods and prevents their distortion under a blow or pressure. The spacing sleeves 16 described with reference to Figure 1, I also prefer to provide in the modifications of Figures 4 and 5.

It will be understood that various modifications of this grid arrangement may be devised and the bracing straps extended across the crate in different positions and at varying angles with respect to the walls; the purpose in each case, however, is to support the longitudinal rods and prevent their distortion or damage by the pressure of a truck or the blow of some object with which the crate may come in contact.

I claim as my invention:

1. A crate comprising side and end walls, a bottom grid comprising rods and a metallic frame fitting within and between the walls of said crate and secured thereto and having holes therein through which said rods pass, the side rails of said frame being braced at the ends adjacent the walls of the crate by the end rails thereof.

2. A crate having side and end walls, a grid fitting within the lower portion of said crate and comprising rods extending between opposite walls and supported thereby, and a metallic frame secured at its ends to opposite walls of the crate and engaging said rods, said frame consisting of a folded metallic strap arranged edgewise to resist upward pressure exerted on the grid.

3. A crate having side and end walls and a grid fitting in the lower portion thereof and comprising rods extending between opposite walls of the crate and supported thereby, and a metallic strap having its ends secured to opposite walls of the crate and its middle portion folded back and forth between said ends, the portions of said strap between said bars being secured through the ends of the bars to the walls of the crate.

4. A crate having side and end walls, a grid fitting within the lower portion of said crate and comprising rods extending between opposite walls and supported thereby, and a metallic reinforcing frame comprising a strap secured at its ends to opposite walls of the crate and looped back and forth between said walls and engaging said rods to resist upward pressure thereon.

5. A crate having side and end walls, a grid fitting within the lower portion of said crate and including a metallic reinforcing frame formed of a folded strap having its ends secured to the opposite walls of the crate and extending back and forth between said walls, the interior of said crate having a series of rods extending horizontally between the opposite walls of the crate, and said grid reinforcing said rods against vertical pressure.

6. A container comprising side and end walls, members extending horizontally between opposite lower walls of said container, and an intermediate reinforcing frame comprising a strap member secured to the inner faces of said walls and extending back and forth between them and reinforcing said members against vertical pressure.

7. An all metal crate bottom comprising opposingly related parallel strips having outstanding hollow longitudinal reinforcing ribs, each having rod-receiving openings, a strap-iron grid element intermediate the ribbed strips, in the same plane therewith, providing a plurality of transverse strap members parallel with the strips with the edges vertically disposed, and adapted to be terminally secured to opposite crate sides, and a series of rods traversing the members and stepped at opposite ends in the rib openings of respective strips.

8. A crate having its sides connected at the bottom by a grid frame, comprising slip-on hollow angle brackets, opposite pairs of which are cross-connected by end support longitudinally ribbed connector elements, a strap element intermediate the connector elements, providing a plurality of transverse members parallel with the connectors and terminally secured to opposite crate sides, and vertically disposed and non-flexible to upward and downward pressure, and a series of rods each traversing all strap iron members and stepped at opposite ends in the ribs of the first mentioned elements.

9. A grid frame for the purpose described having two end supports, each comprising a pair of angled corner side wall connectors connected by a metallic strip, a strap iron element intermediate said end supports and providing members parallel with the end supports and arranged edgewise, and rods traversing said intermediate members and stepped at opposite ends in said strips.

10. A grid frame for the purpose described having two end supports, each comprising a pair of angled corner side wall connectors connected by a metallic strip, a strap iron element intermediate said end supports and providing members parallel with the end supports and arranged edgewise, and rods traversing said intermediate members and stepped at opposite ends in said strips, certain of said rods having sleeves thereon abuttingly engaging between all strips and strap iron members to hold the same against lateral flexure.

In witness whereof, I have hereunto set my hand this 5th day of December, 1923.

CHARLES A. WOOLSEY.